US012603996B2

(12) United States Patent
Chubach et al.

(10) Patent No.: US 12,603,996 B2
(45) Date of Patent: Apr. 14, 2026

(54) USING TEMPLATE MATCHING FOR REFINING CANDIDATE SELECTION

(71) Applicant: MediaTek Singapore Pte. Ltd., Singapore (SG)

(72) Inventors: Olena Chubach, San Jose, CA (US); Chun-Chia Chen, Hsinchu City (TW); Man-Shu Chiang, Hsinchu City (TW); Tzu-Der Chuang, Hsinchu City (TW); Ching-Yeh Chen, Hsinchu City (TW); Chih-Wei Hsu, Hsinchu City (TW); Yu-Wen Huang, Hsinchu City (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 18/684,790

(22) PCT Filed: Aug. 18, 2022

(86) PCT No.: PCT/CN2022/113391
§ 371 (c)(1),
(2) Date: Feb. 19, 2024

(87) PCT Pub. No.: WO2023/020589
PCT Pub. Date: Feb. 23, 2023

(65) Prior Publication Data
US 2024/0357082 A1 Oct. 24, 2024

Related U.S. Application Data

(60) Provisional application No. 63/234,730, filed on Aug. 19, 2021.

(51) Int. Cl.
*H04N 19/119* (2014.01)
*H04N 19/105* (2014.01)
(Continued)

(52) U.S. Cl.
CPC ......... *H04N 19/105* (2014.11); *H04N 19/119* (2014.11); *H04N 19/146* (2014.11);
(Continued)

(58) Field of Classification Search
CPC .. H04N 19/146; H04N 19/513; H04N 19/147; H04N 19/521; H04N 19/176; H04N 19/96; H04N 19/196; H04N 19/119
See application file for complete search history.

(56) References Cited

U.S. PATENT DOCUMENTS 10,958,928 B2 3/2021 Chao et al.
11,159,816 B2 10/2021 Liu et al.
(Continued)

FOREIGN PATENT DOCUMENTS

CN 110582000 A 12/2019
CN 111083489 A 4/2020
(Continued)

OTHER PUBLICATIONS

Partial Supplementary European Search Report dated May 26, 2025, issued in application No. EP 22857898.5.
(Continued)

*Primary Examiner* — Tsion B Owens
(74) *Attorney, Agent, or Firm* — McClure, Qualey & Rodack, LLP

(57) ABSTRACT
A video coding system that uses template matching (TM) to improve signaling of coding modes is provided. The system receives data to be encoded or decoded as a current block of a current picture of a video. The system identifies a set of pixels neighboring the current block as a current template. The system identifies a reference template of each candidate coding mode in a plurality of candidate coding modes. The system computes a template matching (TM) cost for each candidate coding mode based on matching the current
(Continued)

| RefIdx | TM Cost | Re-Ordered |
|---|---|---|
| 0 | 70 | 1 |
| 1 | 100 | 3 |
| 2 | 80 | 2 |
| 3 | 30 | 0 | template with the reference template of the candidate coding mode. The system selects a candidate coding mode from the plurality of candidate coding modes based on the computed TM costs. The system reconstructs the current block or encoding the current block into a bitstream by using selected candidate coding mode.

11 Claims, 13 Drawing Sheets

(51) Int. Cl.

| | |
|---|---|
| *H04N 19/146* | (2014.01) |
| *H04N 19/176* | (2014.01) |
| *H04N 19/196* | (2014.01) |
| *H04N 19/513* | (2014.01) |

(52) U.S. Cl.
CPC ......... *H04N 19/176* (2014.11); *H04N 19/196* (2014.11); *H04N 19/513* (2014.11); *H04N 19/521* (2014.11)

(56) References Cited

U.S. PATENT DOCUMENTS

| | | | | |
|---|---|---|---|---|
| 11,758,185 | B2 * | 9/2023 | Abe | H04N 19/176 |
| | | | | 375/240.12 |
| 11,889,108 | B2 | 1/2024 | Liu et al. | |
| 2011/0261882 | A1 | 10/2011 | Zheng et al. | |
| 2017/0318297 | A1 * | 11/2017 | Puri | H04N 19/167 |
| 2017/0353719 | A1 | 12/2017 | Liu | |
| 2017/0353730 | A1 | 12/2017 | Liu et al. | |
| 2018/0098062 | A1 | 4/2018 | Li | |
| 2018/0098070 | A1 | 4/2018 | Chuang | |
| 2018/0270500 | A1 | 9/2018 | Li et al. | |
| 2018/0316929 | A1 | 11/2018 | Li et al. | |
| 2019/0028731 | A1 | 1/2019 | Chuang | |
| 2019/0215531 | A1 | 7/2019 | Lee | |
| 2019/0335181 | A1 | 10/2019 | Abe | |
| 2020/0213593 | A1 * | 7/2020 | Chiang | H04N 19/513 |
| 2022/0150493 | A1 * | 5/2022 | Ahn | H04N 19/147 |
| 2022/0329823 | A1 | 10/2022 | Chen | |
| 2023/0396801 | A1 * | 12/2023 | Racape | H04N 19/176 |
| 2024/0267533 | A1 * | 8/2024 | Zhang | H04N 19/154 |
| 2024/0314301 | A1 * | 9/2024 | Bordes | H04N 19/11 |
| 2025/0039371 | A1 * | 1/2025 | Kim | H04N 19/132 |
| 2025/0080741 | A1 * | 3/2025 | Nam | H04N 19/105 |

FOREIGN PATENT DOCUMENTS

| | | |
|---|---|---|
| CN | 112262580 A | 1/2021 |
| EP | 3496406 A1 | 6/2019 |
| EP | 3 443 746 B1 | 7/2021 |
| WO | 2011/064673 A1 | 6/2011 |
| WO | 2020/003260 A1 | 1/2020 |

OTHER PUBLICATIONS

Zhang, K., et al.; "AHG12: Unsymmetric partitioning methods in video coding;" Joint Video Experts Team (JVET) of ITU-T SG 16 WP 3 and ISO/IEC JTC 1/SC 29; Apr. 2021; pp. 1-5.

Extended European Search Report dated Sep. 12, 2025, issued in application No. EP 22857898.5.

An, J., et al.; "Enhanced Merge Mode based on JEM7.0;" Joint Video Experts Team (JVET) of ITU-T SG 16 WP 3 and ISO/IEC JTC 1/SC 29/WG 11; Apr. 2018; pp. 1-9.

Wien, M., et al.; "TE1: RWTH partner report on DMVD;" Joint Collaborative Team on Video Coding (JCT-VC) of ITU-T SG16 WP3 and ISO/IEC JTC1/SC29/WG11; Jul. 2010; pp. 1-14.

International Search Report and Written Opinion dated Oct. 25, 2022, issued in application No. PCT/CN2022/113391.

Chinese language office action dated Sep. 5, 2023, issued in application No. TW 111131308.

International Search Report and Written Opinion dated Nov. 21, 2022, issued in application No. PCT/CN2022/113388.

Seregin, V., et al.; "Exploration Experiment on Enhanced Compression beyond VVC capability;" Joint Video Experts Team (JVET) of ITU-T SG 16 WP 3 and ISO/IEC JTC 1/SC 29; Jan. 2021; pp. 1-19.

Office Action dated Jan. 29, 2026, issued in U.S. Appl. No. 18/684,798.

* cited by examiner

SPLIT_BT_VER     SPLIT_BT_HOR     SPLIT_TT_VER     SPLIT_TT_HOR
(VBT)          (HBT)          (VTT)          (HTT)

UBT-H1         UBT-H2         UBT-V1         UBT-V2

UQT-H1         UQT-H2         UQT-V1         UQT-V2

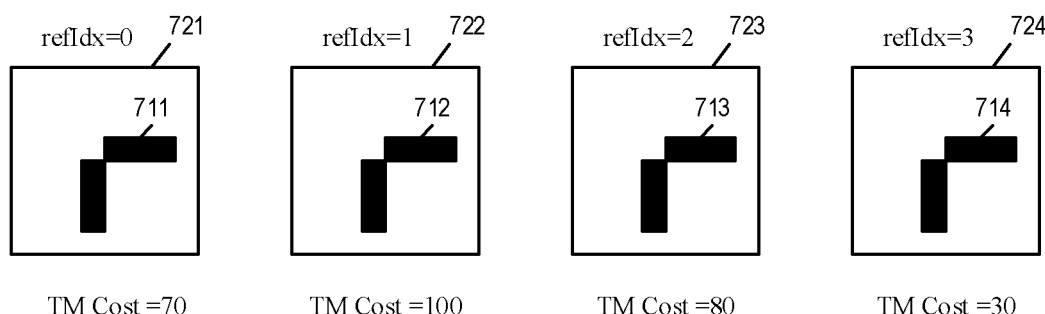
refIdx=0   721     refIdx=1   722     refIdx=2   723     refIdx=3   724
711     712     713     714
TM Cost =70     TM Cost =100     TM Cost =80     TM Cost =30
Current Picture
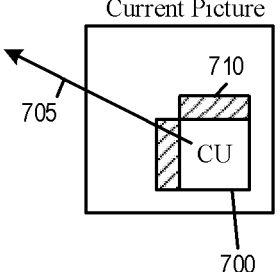
710
705
CU
700
| RefIdx | TM Cost | Re-Ordered |
|--------|---------|------------|
| 0 | 70 | 1 |
| 1 | 100 | 3 |
| 2 | 80 | 2 |
| 3 | 30 | 0 |
FIG. 7
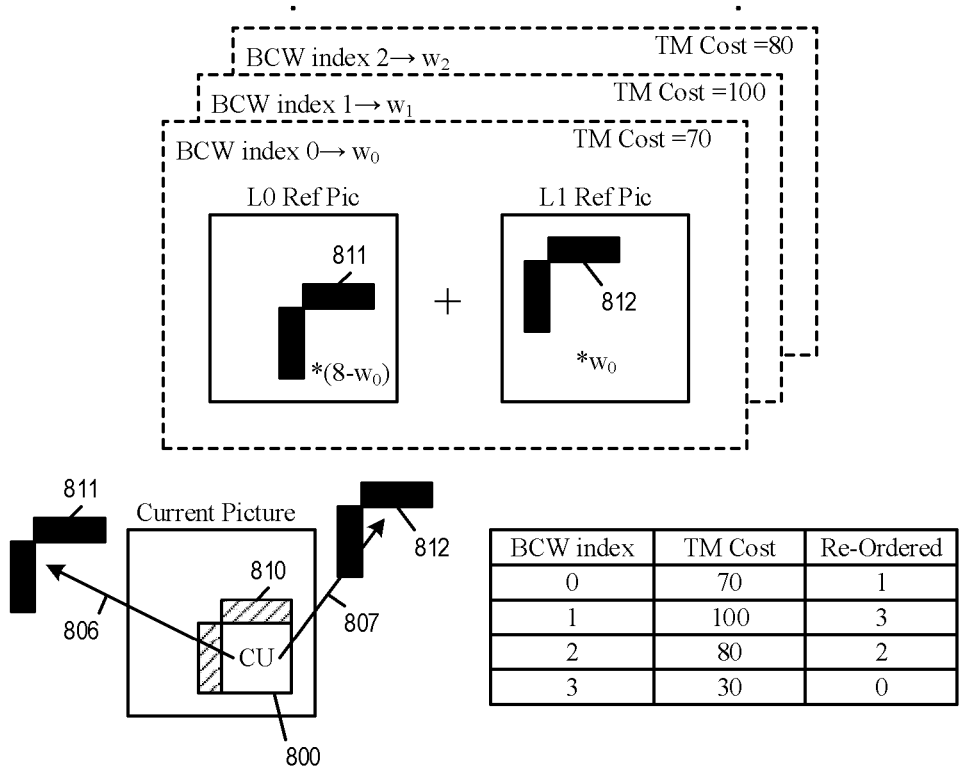
BCW index 2→ $w_2$     TM Cost =80
BCW index 1→ $w_1$     TM Cost =100
BCW index 0→ $w_0$     TM Cost =70
L0 Ref Pic           L1 Ref Pic
811     812
+
$*(8-w_0)$     $*w_0$
811   Current Picture
810     812
806     807
CU
800
| BCW index | TM Cost | Re-Ordered |
|-----------|---------|------------|
| 0 | 70 | 1 |
| 1 | 100 | 3 |
| 2 | 80 | 2 |
| 3 | 30 | 0 |
FIG. 8

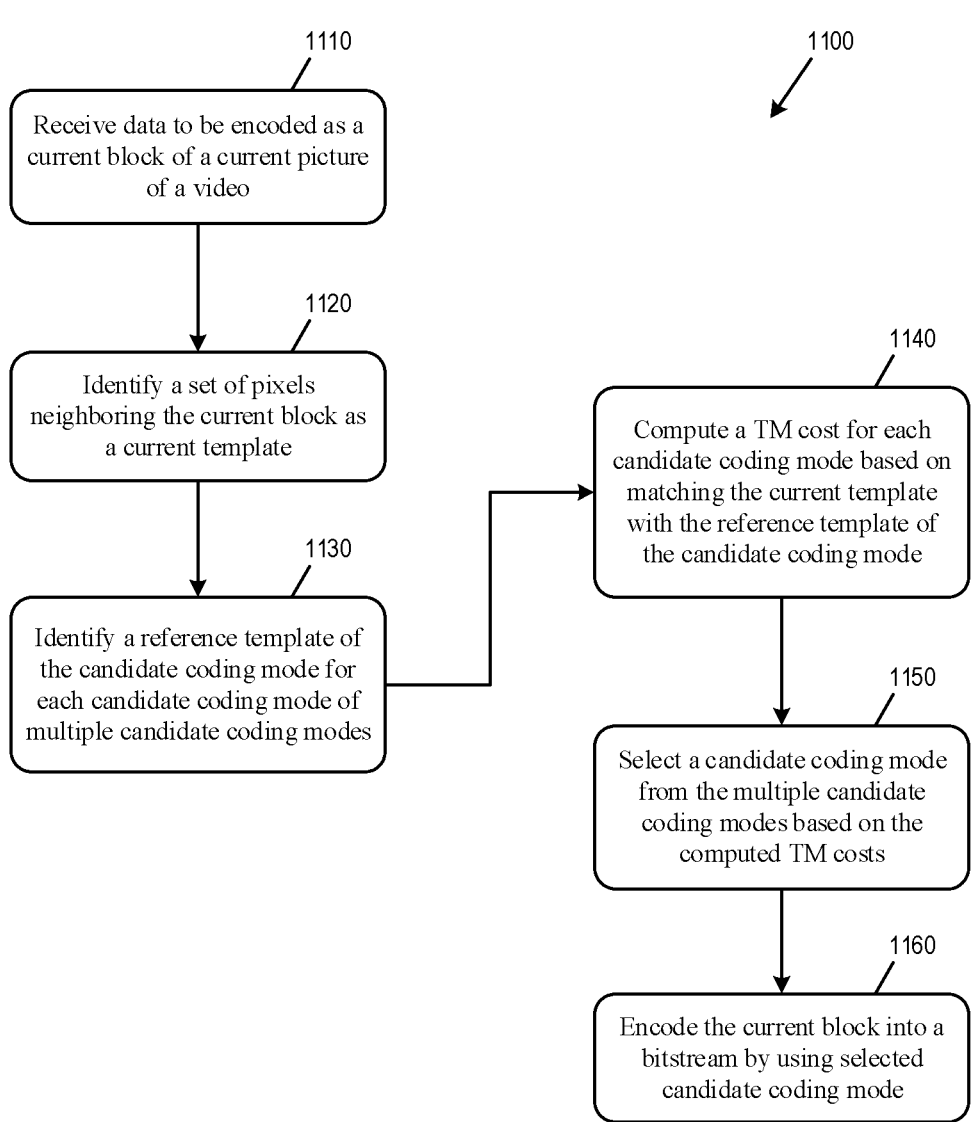

1110

Receive data to be encoded as a current block of a current picture of a video

1100

1120

Identify a set of pixels neighboring the current block as a current template

1130

Identify a reference template of the candidate coding mode for each candidate coding mode of multiple candidate coding modes

1140

Compute a TM cost for each candidate coding mode based on matching the current template with the reference template of the candidate coding mode

1150

Select a candidate coding mode from the multiple candidate coding modes based on the computed TM costs

1160

Encode the current block into a bitstream by using selected candidate coding mode

*FIG. 11*

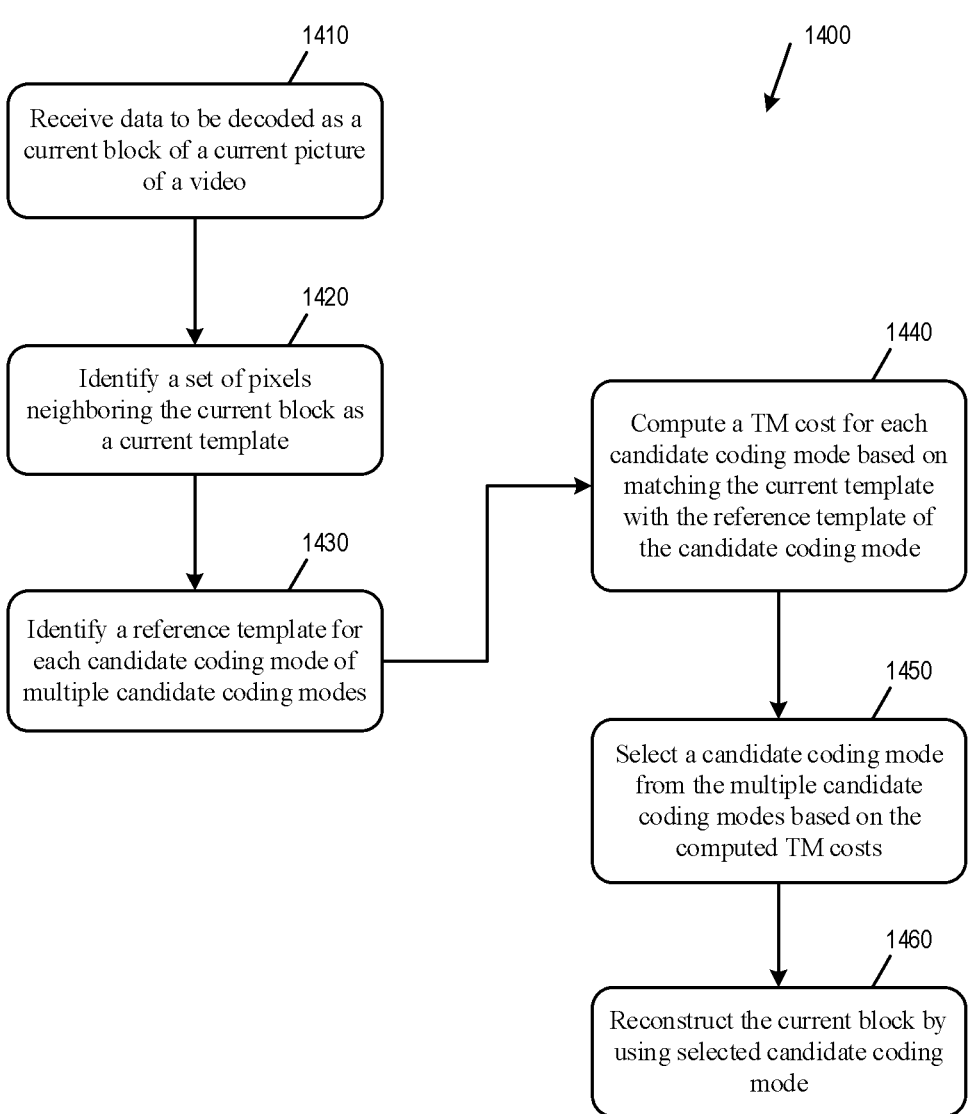

1410

Receive data to be decoded as a
current block of a current picture
of a video

1420

Identify a set of pixels
neighboring the current block as
a current template

1430

Identify a reference template for
each candidate coding mode of
multiple candidate coding modes

1400

1440

Compute a TM cost for each
candidate coding mode based on
matching the current template
with the reference template of
the candidate coding mode

1450

Select a candidate coding mode
from the multiple candidate
coding modes based on the
computed TM costs

1460

Reconstruct the current block by
using selected candidate coding
mode

*FIG. 14*

USING TEMPLATE MATCHING FOR REFINING CANDIDATE SELECTION

CROSS REFERENCE TO RELATED PATENT APPLICATION(S)

The present disclosure is part of a non-provisional application that claims the priority benefit of U.S. Provisional Patent Application No. 63/234,730, filed on 19 Aug. 2021. Content of above-listed application is herein incorporated by reference.

TECHNICAL FIELD

The present disclosure relates generally to video coding. In particular, the present disclosure relates to methods of prediction candidate selection.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

To increase the coding efficiency of motion vector (MV) coding in HEVC, HEVC has the Skip, and Merge mode. Skip and Merge modes obtain the motion information from spatially neighboring blocks (spatial candidates) or a temporal co-located block (temporal candidate). When a PU is Skip or Merge mode, no motion information is coded, instead, only the index of the selected candidate is coded. For Skip mode, the residual signal is forced to be zero and not coded. In HEVC, if a particular block is encoded as Skip or Merge, a candidate index is signaled to indicate which candidate among the candidate set is used for merging. Each merged prediction unit (PU) reuses the MV, prediction direction, and reference picture index of the selected candidate.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments provide a video coding system that uses template matching (TM) to improve signaling of coding modes. The system receives data to be encoded or decoded as a current block of a current picture of a video. The system identifies a set of pixels neighboring the current block as a current template. The system identifies a reference template of each candidate coding mode in a plurality of candidate coding modes. The system computes a template matching cost for each candidate coding mode based on matching the current template with the reference template of the candidate coding mode. The system selects a candidate coding mode from the plurality of candidate coding modes based on the computed TM costs. The system reconstructs the current block or encoding the current block into a bitstream by using selected candidate coding mode.

In some embodiments, the multiple candidate coding modes correspond to multiple different partitioning modes that each partitions the current block into two or more partitions. Each partition has a corresponding current template and a reference template that is identified by a motion vector associated with the partition. In some embodiments, the multiple different partitioning modes includes one or more partitioning modes that partitions the current block vertically and one or more partitioning modes that partitions the current block horizontally. In some embodiments, the multiple different partitioning modes includes partitioning modes that partitions the current block symmetrically or into equal sized partitions and partitioning modes that partitions the current block asymmetrically or into different sized partitions. In some embodiments, the multiple different partitioning modes includes partitioning modes that partitions the current block into two partitions and partitioning modes that partitions the current block into more than two partitions.

For some embodiments in which the candidate coding modes correspond to different partitioning modes, the TM cost of a candidate coding mode is computed based on the current templates and the reference templates of the multiple partitions that are created from the current block by the candidate coding mode. In some embodiments, the TM costs of the different partitioning modes are computed based on a same set of motion vector differences (MVDs) that are signaled in the bitstream or derivable from syntax elements in the bitstream. In some embodiments, the direction of the partitioning is not signaled in the bitstream so that the decoder performs TM to determine the direction of the partitioning based on which direction has the lower TM cost.

In some embodiments, the multiple candidate coding modes correspond to multiple reference picture indices (refIdx) that identify reference pictures in a reference picture list for generating a prediction for encoding the current block. In some embodiments, the video encoder reorders the reference picture indices based on TM costs computed for the multiple candidate coding modes. The video encoder may signal a reordered reference picture index for identifying a reference picture.

In some embodiments, the multiple candidate coding modes correspond to different bidirectional weighting indices (BCW indices) that identify different weighting options for prediction samples obtained with two motion vectors in bidirectional prediction for the current block. The video encoder may reorder the bidirectional weighting indices based on TM costs computed for the multiple candidate coding modes. The video encoder may signal a reordered bidirectional weighting index for identifying a weighting option for the two motion vectors.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 7 conceptually illustrates using TM costs to reorder reference picture indices.

FIG. 8 conceptually illustrates using TM costs to reorder Bi-prediction with CU-level weights (BCW) indices.

FIG. 11 conceptually illustrates a process that uses TM cost to refine selection of a candidate coding modes when encoding a block of pixels.

FIG. 14 conceptually illustrates a process that uses TM costs to refine selection of a candidate coding modes when decoding a block of pixels.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Template Matching

Template matching (TM) is a decoder-side MV derivation method to refine motion information of the current CU by finding the closest match between a template in the current picture and a block in a reference picture. A template of a CU or block generally refers to a specific set of pixels neighboring the top and/or the left of the CU.

Figure 1:
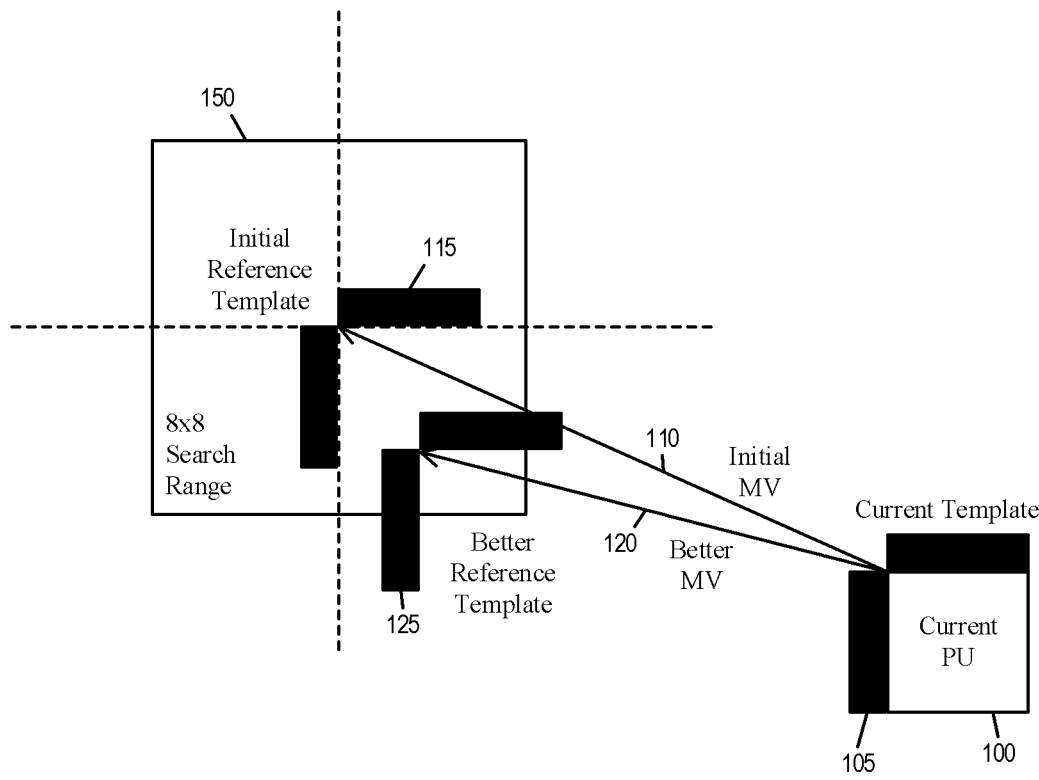
FIG. 1 illustrates template matching that is performed on a search area around an initial motion vector.

FIG. 1 illustrates template matching that is performed on a search area around an initial MV. The video coder (encoder or decoder) searches around an initial MV 110 of the current CU or PU 100 to find a better MV 120 by using template matching. In the example, the search is conducted within a

[−8, +8]-pel search range 150. In the example, the initial MV 110 is used to identify an initial reference template 115 in the reference picture. The search for the better MV is for finding another MV that identifies another reference template 125 that better matches (e.g., by sum of absolute differences or SAD) the current template 105 of the current CU.

In AMVP mode, an MVP candidate is determined based on the template matching error to pick up the one which reaches the minimum difference between the current block and the reference block templates, and then TM is performed only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode. Table 1 below is a list of search patterns for AMVR and merge mode:

TABLE 1

| | | AMVR mode | | | Merge mode | |
|---|---|---|---|---|---|---|
| Search pattern | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

This search process ensures that the MVP candidate keeps the same MV precision as indicated by AMVR mode after TM process.

In merge mode, similar search method is applied to the merge candidate indicated by the merge index. As shown in Table 1, TM may perform all the way down to ⅛-pel MVD precision or skipping those beyond half-pel MVD precision, depending on whether the alternative interpolation filter (that is used when AMVR is of half-pel mode) is used according to the merged motion information. When TM mode is enabled, template matching may work as an independent process or an extra MV refinement process between block-based and subblock-based bilateral matching (BM) methods, depending on whether BM can be enabled or not according to its enabling condition check. When BM and TM are both enabled for a CU, the search process of TM stops at half-pel MVD precision and the resulted MVs are further refined by using the same model-based MVD derivation method as in DMVR.

II. Block Partitioning Modes

In HEVC and VVC, a picture is partitioned into non-overlapped square coding tree units (CTUs). One CTU contains one luma coding tree block (CTB) and two chroma CTBs. Each CTU can be treated as one or further partitioned into multiple coding units (CUs) using quadtree (QT) with nested multi-type tree (MTT). CU partition corresponds to a coding tree leaf node. One CU contains one luma coding block (CB) and two chroma CBs in single tree (one coding tree for luma and chroma). One CU contains one luma CB or two chroma CBs in dual tree, i.e., chroma separate tree (CST⇒one coding tree for luma and another coding tree for chroma). Except for some CU modes or sizes, CU is also used as the basic unit for prediction and transform. The max luma transform size to be either 64 or 32. When the size of a current transform block (TB) is greater than the max transform size in width or height, the TB is inferred to be further split evenly in a horizontal or vertical direction. The maximum luma transform size is 64. 128×128 luma CB has four 64×64 luma TBs.

Figure 2:
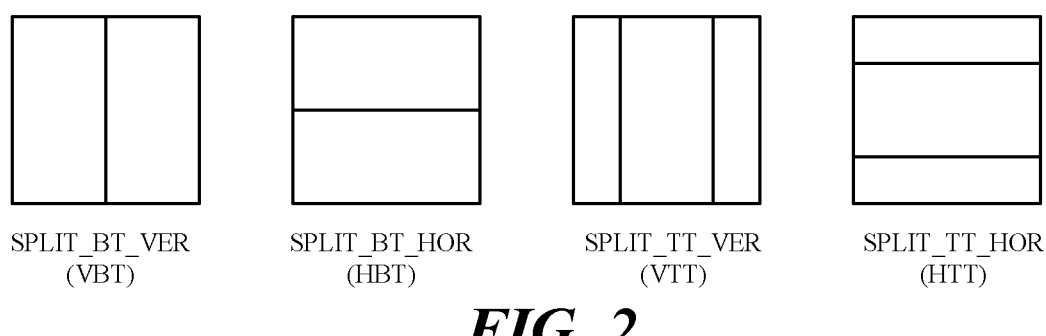
FIG. 2 illustrates different types of multi-type tree split.

FIG. 2 illustrates different types of multi-type tree (MTT) split, including Vertical binary tree (VBT) split, Horizontal binary tree (HBT) split, Vertical ternary tree (VTT) split, and Horizontal ternary tree (HTT) split. Conceptually, beginning from CTU, each coding tree node can be further split by a QT split or one of four MTT splits. If a QT split is applied to a parent node, QT, BT, and TT splits are allowed for its (two, three, or four in case of BT, TT, or QT applied to the parent) child nodes of the parent node. Once a MTT split is applied to a parent node, QT split is disabled for all its descendent nodes (with MTT depth>0), and only BT and TT are allowed for the descendent nodes.

Figure 3:
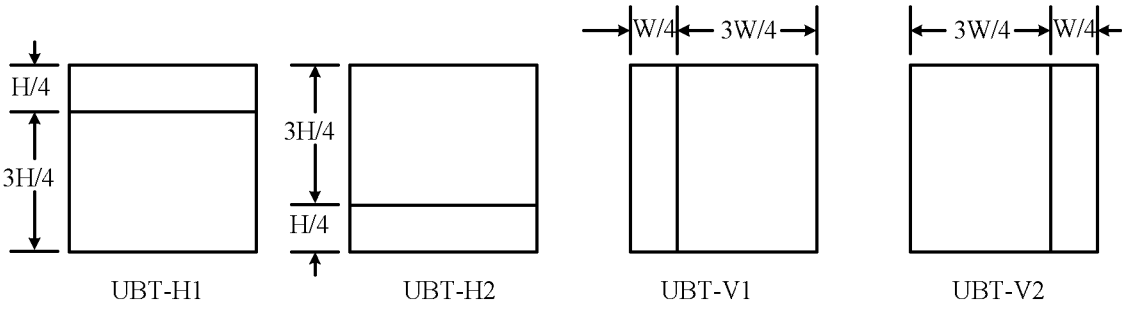
FIG. 3 illustrates four asymmetric or unsymmetric binary tree splitting modes in some embodiments.

In some embodiments, the video coder supports additional asymmetric or unsymmetric binary tree splitting modes, also referred to as ABT or UBT modes. These 4 asymmetric split modes or UBTs are added to the MTT structure of VVC, to allow new splitting configurations. FIG. 3 illustrates four asymmetric or unsymmetric binary tree splitting modes in some embodiments.

As illustrated, there are four UBT modes: UBT-H1, UBT-H2, UBT-V1, and UBT-V2. UBT-H1 and UBT-H2 split a CU with dimension W×H into two child-CUs with dimensions {W×H/4, W×3H/4} and {W×3H/4, W×H/4}, respectively. UBT-V1 and UBT-V2 split a CU with dimension W×H into two child-CUs with dimensions {W/4×H, 3W/4×H} and {3W/4×H, W/4×H}, respectively. With UBT modes, the width or height of a CU or TU may be a non-dyadic number (not in a form of N^2). In some embodiments, some coding tools (e.g., ISP, MIP and SBT) are disabled in CUs that are split by UBT modes. In some embodiments, 6-point, 12-point, 24-point, and 48-point transforms/inverse-transforms are used to encode residual blocks with non-dyadic dimensions.

Figure 4:
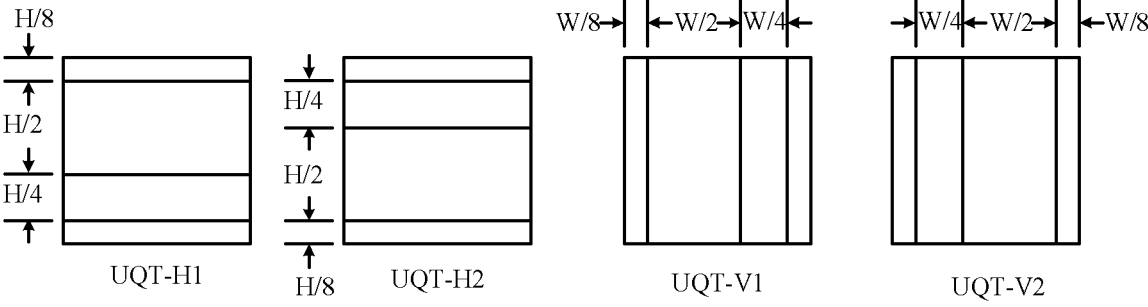
FIG. 4 illustrates four asymmetric or unsymmetric quaternary tree splitting modes in some embodiments.

In some embodiments, the video coder supports additional asymmetric or unsymmetric quaternary tree splitting modes, called UQTs. FIG. 4 illustrates four asymmetric or unsymmetric quaternary tree splitting modes in some embodiments. As illustrated, there are four UQT modes: UQT-H1, UQT-H2, UQT-V1, and UQT-V2. UQT-H1 and UQT-H2 split a CU with dimension W×H into four child-CUs with dimensions {W×H/8, W×H/2, W×H/4, W×H/8} and {W×H/8, W×H/4, W×H/2, W×H/8}, respectively. UQT-V1 and UQT-V2 split a CU with dimension W×H into four child-CUs with dimensions {W/8×H, W/2×H, W/4×H, W/8×H} and {W/8×H, W/4×H, W/2×H, W/8×H}, respectively.

III. Using Template Matching to Evaluate and Select Partitioning

Some embodiments of the disclosure provide methods of using template matching (TM) to evaluate different partitioning modes for coding a CU, such that the partitioning mode yielding the best TM result is selected for coding the CU. In some embodiments, HBT and VBT partitioning modes are tested and one direction is selected based on the TM result. In some embodiments, HBT and VBT are tested with the same MVs and one of the two partitioning modes or partitioning directions is chosen based on the smallest TM cost. In some embodiments, two initial MVs are coded. According to the two initial MVs and the allowed split (HBT or VBT), the video coder obtains the TM result (based on the left/right and top/bottom partitions and their corresponding templates) to identify the partitioning mode with the smaller cost as the TM-based refinement.

Figure 5A:
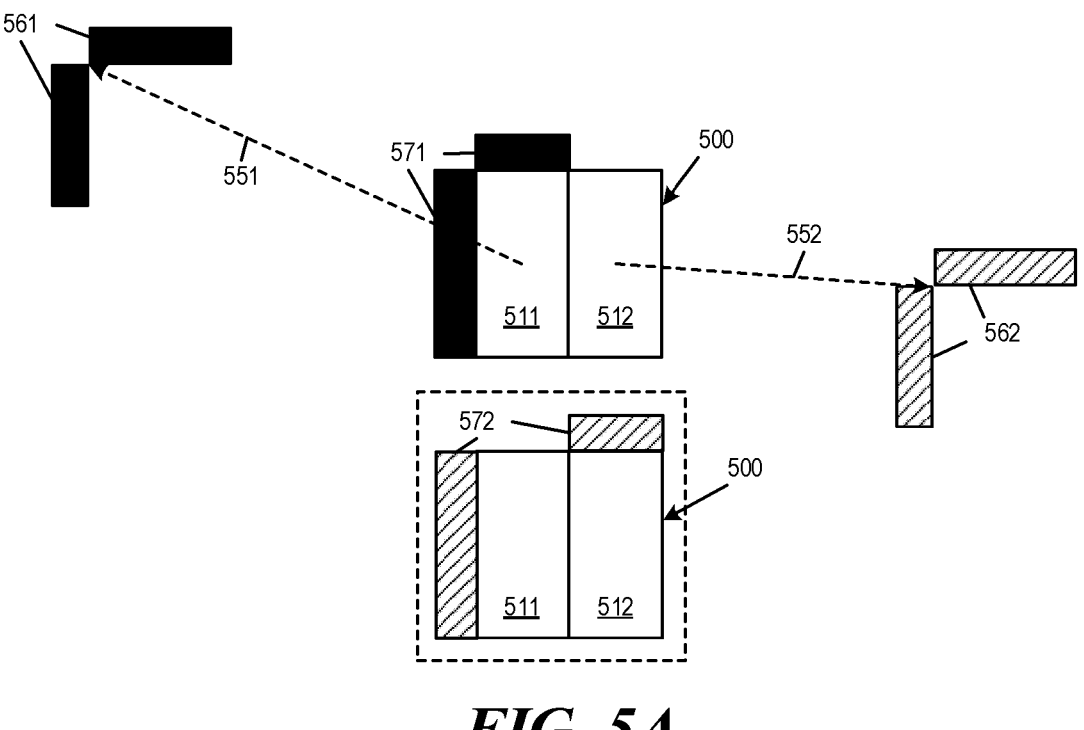
FIGS. 5A-B conceptually illustrate using template matching to evaluate two different partitioning modes for coding a coding unit.
Figure 5B:
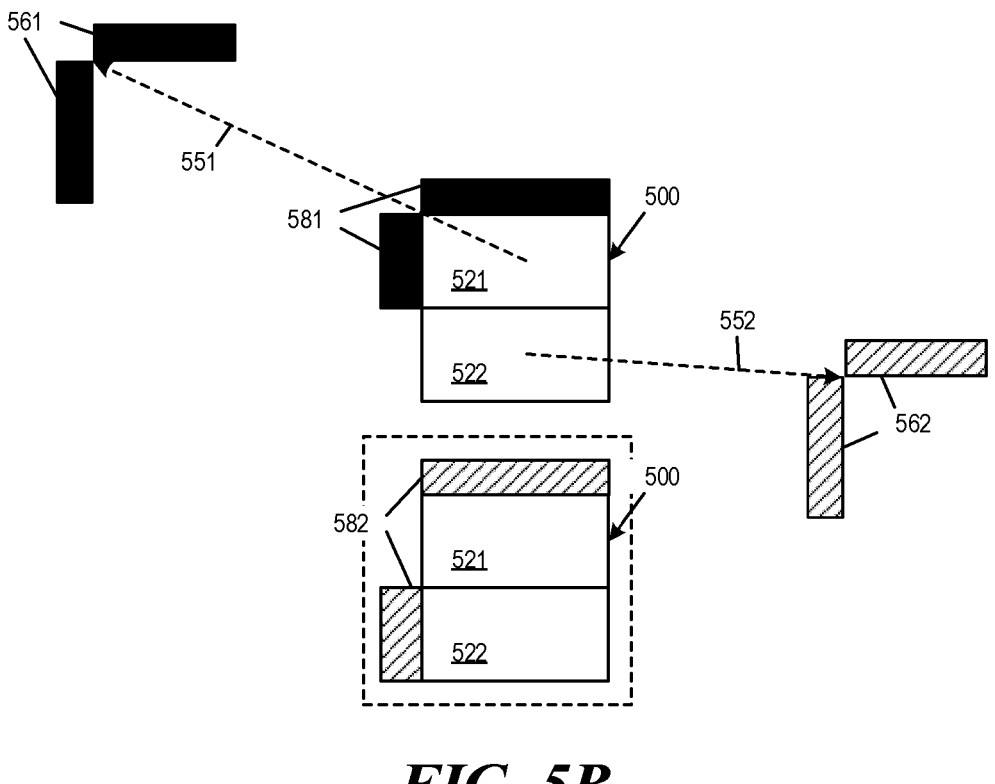

FIGS. 5A-B conceptually illustrate using template matching to evaluate two different partitioning modes for coding a CU 500. The CU 500 are to be coded as two partitions by either VBT mode into partitions 511 and 512 (as shown in FIG. 5A), or by HBT mode into partitions 521 and 522 (as shown in FIG. 5B).

As illustrated in FIG. 5A, when evaluating VBT using TM, two MVs 551 and 552 are used to identify L-shape reference templates 561 and 562 for matching the current templates of the partitions 511 and 512 (templates 571 and 572). As illustrated in FIG. 5B, when evaluating HBT using TM, the same two MVs 551 and 552 are used to identify the L-shape reference templates 561 and 562 for matching the current templates of the partitions 521 and 522 (template 581 and 582). The video coder may choose either HBT or VBT for partitioning the CU 500 based on which mode has the smallest TM cost.

In some embodiments, for BT split modes in which the CU is partitioned into two partitions (partition 1 and partition 2, e.g., partitions 511 and 512 of the CU 500), two motion vector differences (MVDs) are signaled or derived for the two partitions. TM is performed to test each partitioning mode and the best one is chosen based on the TM results.

In some embodiments, partitions created by HBT and VBT are tested (evaluated by TM, as in the example of FIGS. 5A-B), and one direction or partitioning mode (either VBT or HBT) is selected based on TM's result. In some embodiments, HBT, VBT, UBT-H1, UBT-H2, UBT-V1, and UBT-V2 are evaluated and one direction and/or one partitioning mode is selected based on TM's result. In some embodiments, TM is used to evaluate the partitioning modes under TT and/or UQT in a similar way.

Figure 6A:
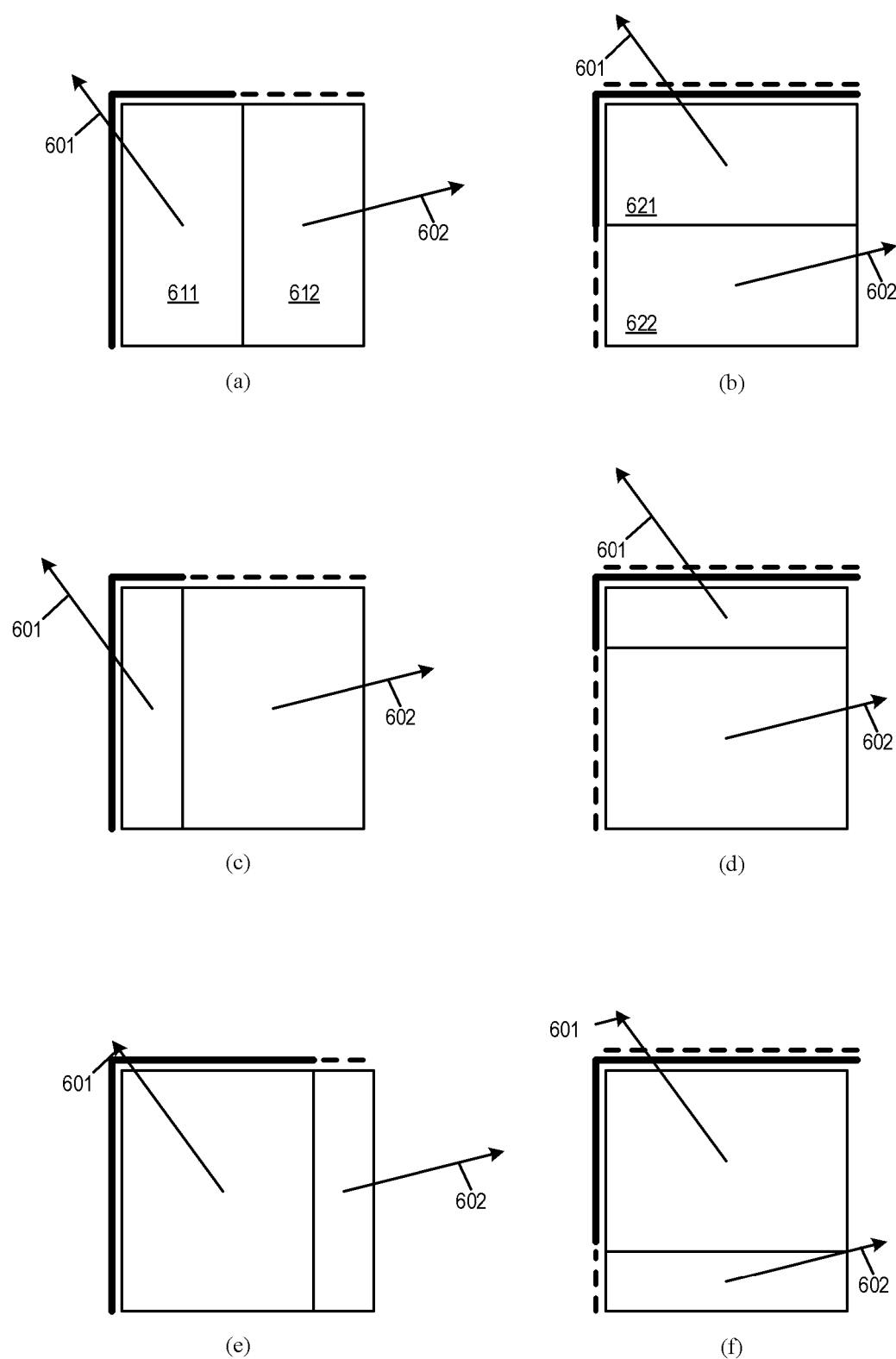
FIGS. 6A-B illustrate two MVs being used to evaluate different binary tree partitioning modes under template matching (TM).
Figure 6B:
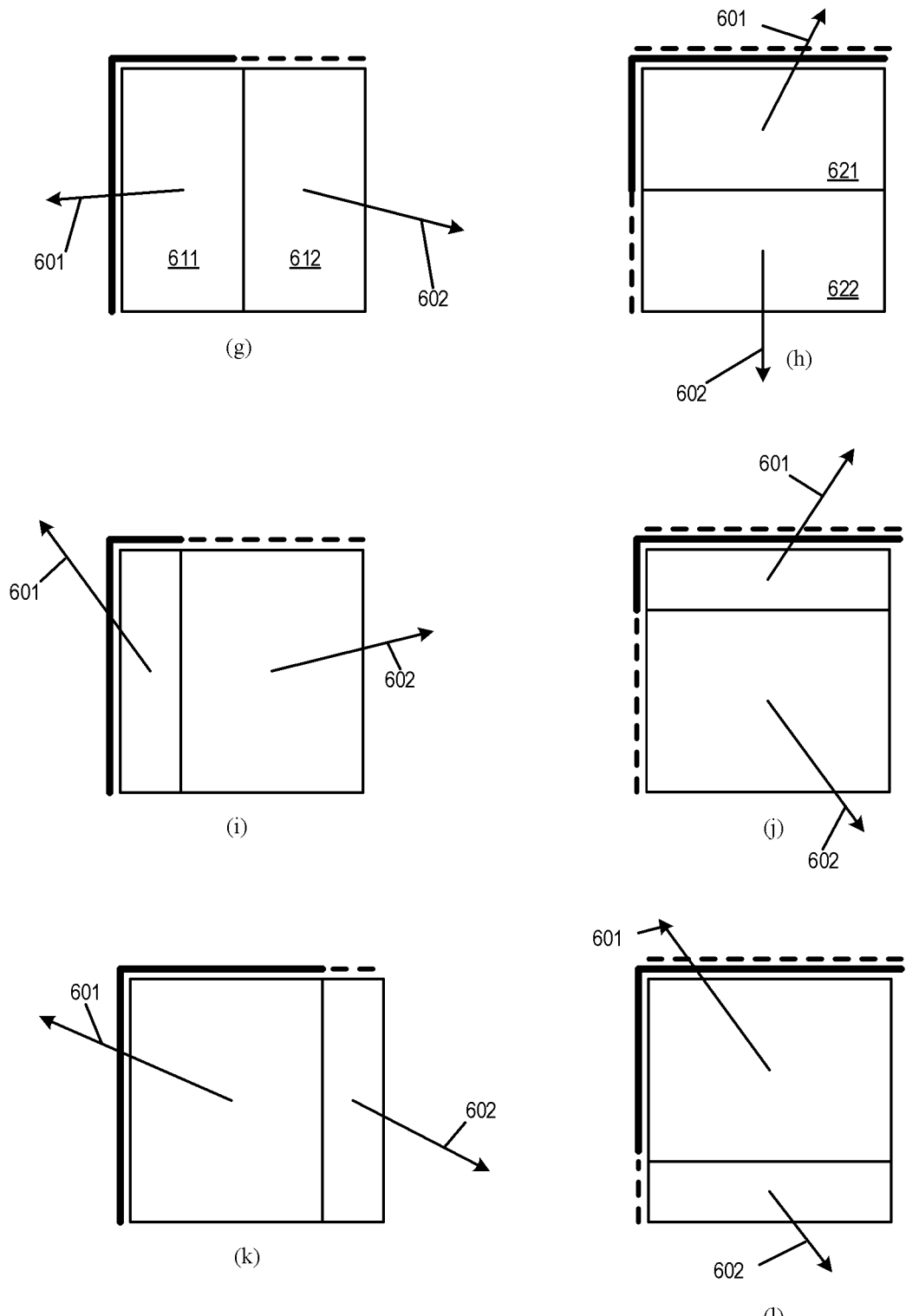

FIGS. 6A-B illustrate two MVs being used to evaluate different BT partitioning modes under TM. FIG. 6A illustrates several possible BT partitioning modes being evaluated by TM, including (a) VBT, (b) HBT, (c) UBT-V1, (d) UBT-H1, (e) UBT-V2, (f) UBT-H2. As illustrated, the same two MVs 601 and 602 are applied to each of the BT partitioning modes (a)-(f). In other words, the two MVs 601 and 602 are used to identify the two reference templates for the two partitions of each of the BT partitioning modes. TM is performed to test each partitioning mode and the best one is chosen based on the TM results.

In some embodiments, there can be different MVs obtained for different partitioning modes based on same two MVDs. In the examples of FIG. 6A, the different partitioning modes are illustrated as using the same two MVs. In some embodiments, (a) may be selected among (a) to (f) in FIG. 6A or among any subsets of (a) to (f) in FIG. 6A based on the TM's result of the present invention. However, in some embodiments, different partitioning modes may use different MVPs. Thus, though the final MVs are computed based on the same MVDs, the different MVPs of different partitioning mode may result in different MVs. FIG. 6B illustrates different partitioning modes using different MVs. The different partitioning modes being illustrated include (g) VBT, (h) HBT, (i) UBT-V1, (j) UBT-H1, (k) UBT-V2, (l) UBT-H2. For example, for the case of (g) VBT versus (h) HBT, the left partition of VBT (e.g., partition 611) and the top partition of HBT (e.g., partition 621) may have different motion vector predictor (MVP) candidates, since different available neighboring blocks may result in different MVPs. Thus, even adding the same MVDs to the corresponding MVPs, the resulting MVs will be different for different partitioning modes. Regardless, the partitioning mode with the lowest TM cost will be chosen by the encoder and the decoder. In some other embodiments, (g) to (l) show different examples of the selected BT partitioning modes with their corresponding MV under TM's result of the present invention.

In some embodiments, the definition of template of each sub-block or partition may vary depending on the partition's position. For example, in FIG. 6A (a), for the left sub-block 611, samples from the left and/or above (marked in bold lines) are used as its template; and for the right sub-block 612, only samples from above (marked in dashed line) may be used as its template. For another example, in FIG. 6A (b), the top sub-block 621 may use samples from above and left (marked in bold lines) as its template; and the bottom sub-block 622 may combine samples from the line above the top sub-block 621 and samples from the left of the current sub-block 622 (marked with dashed lines) as its template. (Thus, the samples above sub-block 621 are used as template for both sub-blocks 621 and 622 in this example.)

In some embodiments, partitioning direction is not signaled to the decoder (which eliminates the BT/ABT flag from the bitstream syntax). In some embodiments, if the TM-based approach is applied to only BT, then partitioning type (BT/TT) is still signaled, though the direction of the split is not. In some embodiments, the TM-based approach is extended to both BT and TT. In some embodiments, the TM-based approach is extended to UQT.

In some embodiments, a TM-partitioning-direction mode is provided. Specifically, TM is used to select a partitioning direction based on which partitioning direction has lower TM cost at both the encoder and the decoder. According to the TM-partitioning mode, two or more MVDs and a flag identifying that there are two or more partitions inside the CU are signaled to the decoder (directly or implicitly), but partitioning direction (horizontal/vertical) is determined by the decoder (based on TM.) In some embodiments, multiple TM-partitioning-direction modes are provided (e.g., TM_BT and TM_TT) according to which two (in case of BT) or three (in case of TT) MVDs are signaled to the decoder together with a flag indicating to the decoder whether there are two or three partitions inside the CU, but the partitioning direction (horizontal/vertical) is defined at the decoder (based on TM.)

In some embodiments, using TM is only allowed in inter-mode. In some embodiments, using TM for defining a partitioning direction is only allowed in inter-mode. In some embodiments, using TM for defining a partitioning direction is only allowed in inter-mode and IBC.

IV. Using Template Matching to Improve Signaling by Index Reordering

The reference frame index (refIdx) is the index for identifying a reference picture in a reference picture list (list0 or list1). In some embodiments, the signaling of refIdx can be improved based on TM cost. For example, a video coder (encoder or decoder) may compute a TM cost for each reference picture (i.e., for each refIdx) in each reference picture list, then reorder the indices (refIdx) of the reference pictures in each reference list based on the computed TM costs. A video encoder may signal a reordered refIdx index to the video decoder. The video decoder also reorders refIdx in the reference list based on TM costs so the video decoder may decode the reordered refIdx and obtain final value (or the true value before the reordering) of refIdx.

In some embodiments, reference picture list (list0 and/or list1) is reordered based on the TM cost (e.g., comparison between current L-shape template and reference L-shape template). The refIdx identifying a reference picture with the smaller TM cost is considered better than a refIdx identifying a reference picture with a larger TM cost. Such a smaller-TM-cost refIdx is moved to the front of the reference list. In some embodiments, the list0 and/or list1 elements are reordered based on the TM cost, and the decoder may receive a flag indicating that list0 or list1 is reordered based on TM (reordered-list-indicator) for the current CU (or picture/slice/GOP/sequence), and, in this case the TM cost is first used to reorder the reference list (list0/1) and then the candidate is taken from the reordered reference list.

FIG. 7 conceptually illustrates using TM costs to reorder reference picture indices. As illustrated, a current CU 700 has a MV 705. Samples to the top and left of the CU 700 are used as the L-shaped current template 710 of the current CU 700. The MV 705 is used to reference L-shaped reference templates 711-714 in reference pictures 721-724 (with refIdx=0, 1, 2, and 3, respectively.) Each of these L-shaped reference templates 711-714 is matched with the current template 710 to determine the TM cost of the corresponding reference picture index refIdx. The reference picture indices are then re-ordered based on the determined TM costs. In the example, the reference picture with refIdx=0 is reordered as 1, the reference picture with refIdx=1 is reordered as 3, the reference picture with refIdx=2 is reordered as 2. The reference picture with refIdx=3 is reordered as 0 since it has the lowest TM cost.

In some embodiments, no refIdx is signaled to the decoder, and refIdx=0 in the TM-reordered reference list is used for reference. In some embodiments, the video coder may select a set of reference pictures for reordering, and their indices (refIdx's) can be sent explicitly. In other words, not all but only a subset of the reference pictures in reference list have their indices (refIdx) reordered by TM and explicitly signaled.

Bi-prediction with CU-level weights, or BCW, is a coding mode or coding tool that allows different weights for L0 prediction and L1 prediction in bi-prediction. Bi-prediction is generated with one weighting parameter w signalled for the coding unit:

$$P_{bi-pred} = ((8-w)*P_0 + w*P_1 + 4) \gg 3 \qquad \text{(Eq. 1)}$$

$P_0$ represents pixel values predicted by L0 MV (or L0 prediction). $P_1$ represents pixel values predicted by L1 MV (or L1 prediction). $P_{bi-pred}$ is the weighted average of $P_0$ and $P_1$ according to the weighting parameter w. For low delay pictures, i.e., having reference pictures with small picture order counts, the possible values or options/candidates for w include $\{-2, 3, 4, 5, 10\}$. For non-low-delay pictures, the possible values or options for w include $\{3, 4, 5\}$. Each option for w' is assigned an index (BCW index). The BCW index of the selected weighting parameter is explicitly signaled for inter (prediction) mode. For merge mode, the BCW index is inherited from the selected merging candidate or set to be the default value indicating the equal weight. In some embodiments, a SPS flag is used to indicate whether BCW mode is enabled or disabled (sps_bcw_enabled_flag).

In some embodiments, TM cost is used to improve BCW index signaling. Specifically, the BCW indices are reordered based on TM costs of individual weighting parameter options (w), so that the BCW index with the best TM cost is placed at the beginning of the list and coded with the minimum index cost (e.g., signaled in the bitstream with the least number of bits.)

FIG. 8 conceptually illustrates using TM costs to reorder BCW indices. As illustrated, a current CU 800 has a L0 MV 806 and a L1 MV 807. The L0 MV 806 is used to identify a L-shaped reference template 811 in the L0 reference picture and the L1 MV 807 is used to identify a L-shaped reference template 812 in the L1 reference picture. For each BCW index (and corresponding weight parameter w), the video coder computes the bi-prediction for the current CU according to Eq. (1), except $P_0$ and $P_1$ are reference templates 811 and 812. The bi-prediction result of each BCW index is matched with a L-shaped current template 810 of the current CU 800 to produce the TM cost of that BCW index. The BCW indices are then re-ordered based on the TM costs. In the example, the BCW index 0 is reordered as 1, the BCW index 1 is reordered as 3, the BCW index 2 is reordered as 2. The BCW index 3 is reordered as 0 because it has the lowest TM cost.

In some embodiments, not all BCW indices are included in reordering process. For example, the video coder may apply TM and reordering to only the first two (or three) BCW indices, and the remaining three (or two) BCW indices are signaled according to their original order.

In some embodiments, there can be multiple different BCW sets (e.g., additional sets with different BCW weight candidates for the low delay pictures and/or for non-low-delay pictures). The different BCW sets are compared using TM, so that when TM is performed, the applied BCW sets can be different, and the video coder may select one BCW set from the different BCW sets based on TM costs.

In some embodiments, the reordering of reference pictures (refIdx) and/or BCW can be implicitly turned on/off, according to the CU size/CU shape. For example, the video coder may turn off reordering of refIdx and/or BCW index if the size of the current CU is less (or larger) than a certain threshold size. In some embodiments, a flag in slice level (or picture/tile/sequence/header level) is signaled to indicate that the TM-cost-based reordering (of refIdx or BCW index) is turned on/off.

Template matching may also be used to improve signaling for other coding tools or coding modes, such as LIC mode and CIIP mode. Local Illumination Compensation (LIC) is based on a linear model for illumination changes, using a scaling factor a and an offset b. And it is enabled or disabled adaptively for each inter-mode coded coding unit (CU). When LIC is applied to a CU, a least square error method is employed to derive the parameters a and b by using the neighbouring samples of the current CU and their corresponding reference samples. More specifically, the sub-sampled neighbouring samples of the CU and the corresponding samples (identified by motion information of the current CU or sub-CU) in the reference picture are used. The LIC parameters are derived and applied for each prediction direction separately. When a CU is coded with merge mode, the LIC flag is copied from neighbouring blocks, in a way similar to motion information copy in merge mode; otherwise, a LIC flag is signalled for the CU to indicate whether LIC applies or not.

In some embodiments, when a CU is coded in merge mode, if the CU contains at least 64 luma samples (that is, CU width times CU height is equal to or larger than 64), and if both CU width and CU height are less than 128 luma samples, an additional flag can be signaled to indicate if the combined inter/intra prediction (CIIP) mode is applied to the current CU. The CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks as follows:

If the top neighbor is available and intra coded, then set isIntraTop to 1, otherwise set isIntraTop to 0;

If the left neighbor is available and intra coded, then set isIntraLeft to 1, otherwise set isIntraLeft to 0;

If (isIntraLeft+isIntraTop) is equal to 2, then wt is set to 3;

Otherwise, if (isIntraLeft+isIntraTop) is equal to 1, then wt is set to 2;

Otherwise, set wt to 1.

The CIIP prediction is formed as follows:

$$P_{CIIP} = ((4 - wt) * P_{inter} + wt * P_{intra} + 2) \gg 2$$

V. Example Video Encoder

Figure 9:
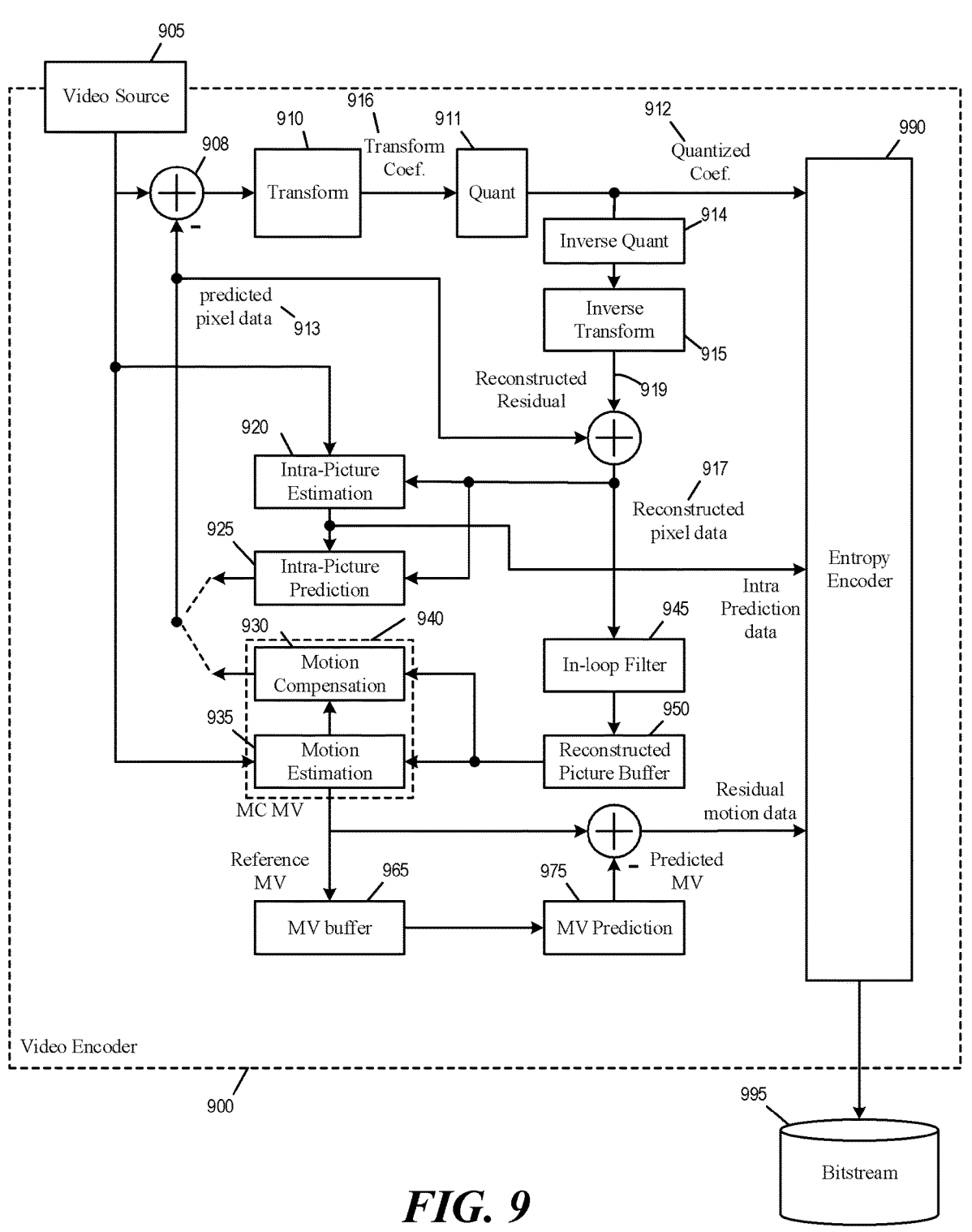
FIG. 9 illustrates an example video encoder that may use TM costs to refine selection of candidate coding modes.

FIG. 9 illustrates an example video encoder 900 that may use TM costs to refine selection of candidate coding modes. As illustrated, the video encoder 900 receives input video signal from a video source 905 and encodes the signal into bitstream 995. The video encoder 900 has several components or modules for encoding the signal from the video source 905, at least including some components selected from a transform module 910, a quantization module 911, an inverse quantization module 914, an inverse transform module 915, an intra-picture estimation module 920, an intra-prediction module 925, a motion compensation module 930, a motion estimation module 935, an in-loop filter 945, a reconstructed picture buffer 950, a MV buffer 965, and a MV prediction module 975, and an entropy encoder 990. The motion compensation module 930 and the motion estimation module 935 are part of an inter-prediction module 940.

In some embodiments, the modules 910-990 are modules of software instructions being executed by one or more processing units (e.g., a processor) of a computing device or electronic apparatus. In some embodiments, the modules 910-990 are modules of hardware circuits implemented by one or more integrated circuits (ICs) of an electronic apparatus. Though the modules 910-990 are illustrated as being separate modules, some of the modules can be combined into a single module.

The video source 905 provides a raw video signal that presents pixel data of each video frame without compression. A subtractor 908 computes the difference between the raw video pixel data of the video source 905 and the predicted pixel data 913 from the motion compensation module 930 or intra-prediction module 925. The transform module 910 converts the difference (or the residual pixel data or residual signal 908) into transform coefficients (e.g., by performing Discrete Cosine Transform, or DCT). The quantization module 911 quantizes the transform coefficients into quantized data (or quantized coefficients) 912, which is encoded into the bitstream 995 by the entropy encoder 990.

The inverse quantization module 914 de-quantizes the quantized data (or quantized coefficients) 912 to obtain transform coefficients, and the inverse transform module 915 performs inverse transform on the transform coefficients to produce reconstructed residual 919. The reconstructed residual 919 is added with the predicted pixel data 913 to produce reconstructed pixel data 917. In some embodiments, the reconstructed pixel data 917 is temporarily stored in a line buffer (not illustrated) for intra-picture prediction and spatial MV prediction. The reconstructed pixels are filtered by the in-loop filter 945 and stored in the reconstructed picture buffer 950. In some embodiments, the reconstructed picture buffer 950 is a storage external to the video encoder 900. In some embodiments, the reconstructed picture buffer 950 is a storage internal to the video encoder 900.

The intra-picture estimation module 920 performs intra-prediction based on the reconstructed pixel data 917 to produce intra prediction data. The intra-prediction data is provided to the entropy encoder 990 to be encoded into bitstream 995. The intra-prediction data is also used by the intra-prediction module 925 to produce the predicted pixel data 913.

The motion estimation module 935 performs inter-prediction by producing MVs to reference pixel data of previously decoded frames stored in the reconstructed picture buffer 950. These MVs are provided to the motion compensation module 930 to produce predicted pixel data.

Instead of encoding the complete actual MVs in the bitstream, the video encoder 900 uses MV prediction to generate predicted MVs, and the difference between the MVs used for motion compensation and the predicted MVs is encoded as residual motion data and stored in the bitstream 995.

The MV prediction module 975 generates the predicted MVs based on reference MVs that were generated for encoding previously video frames, i.e., the motion compensation MVs that were used to perform motion compensation. The MV prediction module 975 retrieves reference MVs from previous video frames from the MV buffer 965. The video encoder 900 stores the MVs generated for the current video frame in the MV buffer 965 as reference MVs for generating predicted MVs.

The MV prediction module 975 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 995 by the entropy encoder 990.

The entropy encoder 990 encodes various parameters and data into the bitstream 995 by using entropy-coding techniques such as context-adaptive binary arithmetic coding (CABAC) or Huffman encoding. The entropy encoder 990 encodes various header elements, flags, along with the quantized transform coefficients 912, and the residual motion data as syntax elements into the bitstream 995. The bitstream 995 is in turn stored in a storage device or transmitted to a decoder over a communications medium such as a network.

The in-loop filter 945 performs filtering or smoothing operations on the reconstructed pixel data 917 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 10:
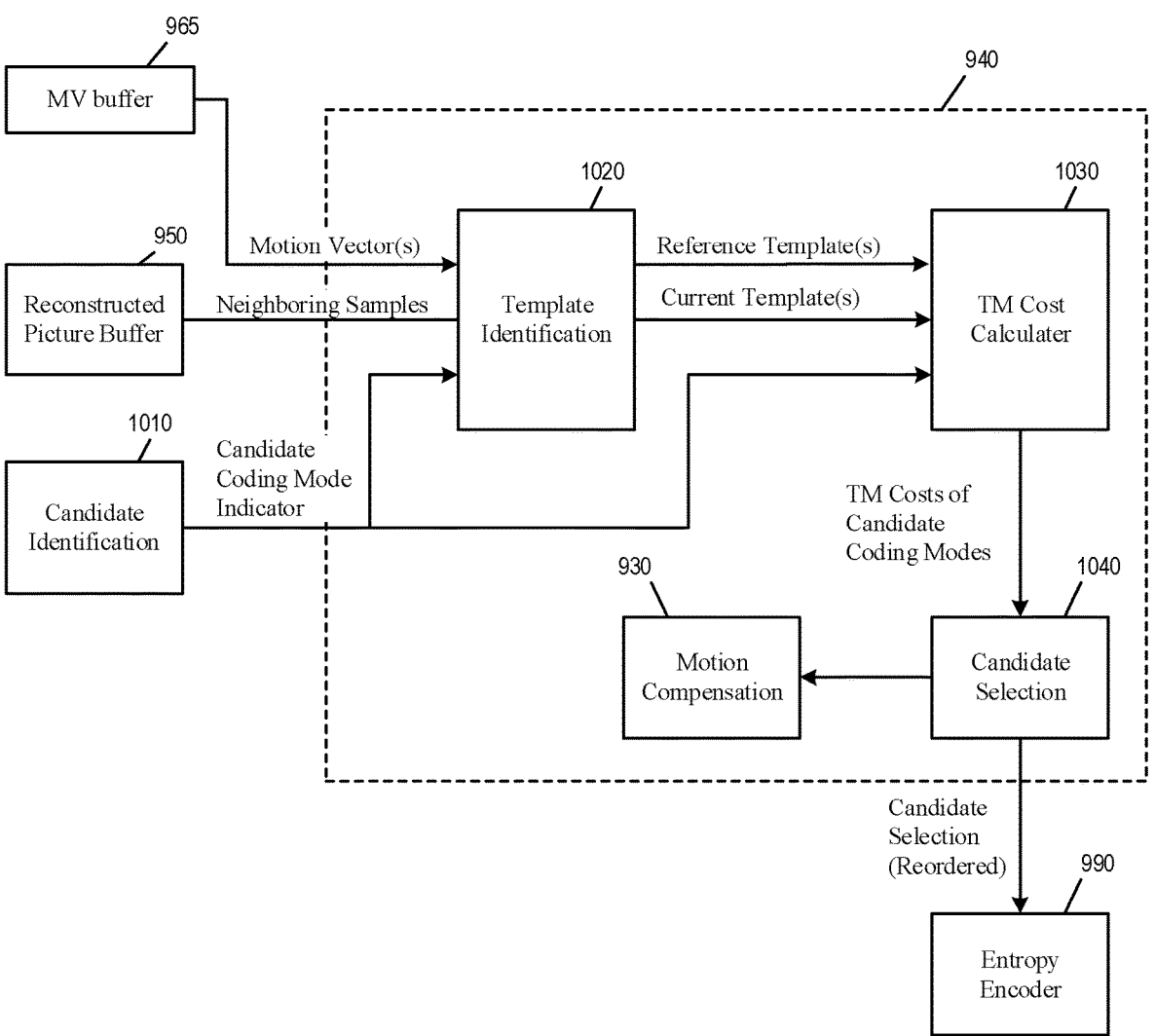
FIG. 10 illustrates portions of the video encoder that implement candidate coding mode selection based on TM costs.

FIG. 10 illustrates portions of the video encoder 900 that implement candidate coding mode selection based on TM costs. Specifically, the figure illustrates the components of the inter-prediction module 940 of the video encoder 900. As illustrated, a candidate identification module 1010 provide candidate coding modes indicators to the inter-prediction module 940. These possible candidate coding modes may correspond to various partitioning modes (BT, TT, UBT, UQT, BCW, etc.), different bidirectional weighting options (BCW indices), or different reference picture indices (refIdx).

Based on the candidate coding mode indicators, a template identification module 1020 selects motion vectors from the MV buffer 965 and retrieves neighboring samples from the reconstructed picture buffer 950 as L-shaped templates. For example, for a candidate coding mode that is a BT partitioning mode, the template identification module 1020 may retrieve neighboring pixels of the current block as two current templates of the two partitions of the current block, and use two motion vectors to retrieve two L-shaped pixel sets as two reference templates. As another example, for a candidate coding mode that is a BCW weight option, the template identification module 1020 may retrieve two reference templates based on a L0 MV and a L1 MV.

The template identification module 1020 provides the reference template(s) and the current template(s) of the currently indicated coding mode to a TM cost calculator 1030, which performs matching to produce a TM cost for the indicated candidate coding mode. The TM cost calculator 1030 may weigh the reference templates differently based on the indicated candidate coding mode (e.g., for BCW).

The computed TM costs are provided to a candidate selection module 1040, which may use the TM costs to select a lowest cost candidate coding mode for encoding the current block. In some embodiments, the candidate selection module 1040 may assign reordered indices to the candidate coding modes based on the computed TM costs. The selected coding mode is indicated to the motion compensation module 930 to complete prediction for encoding the current block. The selected coding mode is also provided to the entropy encoder 990 to be signaled in the bitstream. The selected coding mode may be signaled by using the coding mode's corresponding reordered index to reduce the number of bits transmitted.

FIG. 11 conceptually illustrates a process 1100 that uses TM cost to refine selection of a candidate coding modes when encoding a block of pixels. In some embodiments, one or more processing units (e.g., a processor) of a computing device implements the encoder 900 performs the process 1100 by executing instructions stored in a computer readable medium. In some embodiments, an electronic apparatus implementing the encoder 900 performs the process 1100.

The encoder receives (at block 1110) data to be encoded as a current block of pixels in a current picture of a video. The encoder identifies (at block 1120) a set of pixels neighboring the current block as a current template.

The encoder identifies (at block 1130) a reference template of each candidate coding mode of multiple candidate coding modes. In some embodiments, the multiple candidate coding modes correspond to multiple different partitioning modes that each partitions the current block into two or more partitions. Each partition has a corresponding current template and a reference template that is identified by a motion vector associated with the partition. In some embodiments, the multiple different partitioning modes includes one or more partitioning modes that partitions the current block vertically (e.g., VBT, VTT, UBT-V, UQT-V) and one or more partitioning modes that partitions the current block horizontally (e.g., HBT, HTT, UBT-H, UQT-H). In some embodiments, the multiple different partitioning modes includes partitioning modes that partitions the current block symmetrically or into equal sized partitions (e.g., BT) and partitioning modes that partitions the current block asymmetrically or into different sized partitions (e.g., TT, UBT, UQT). In some embodiments, the multiple different partitioning modes includes partitioning modes that partitions the current block into two partitions (e.g., BT) and partitioning modes that partitions the current block into more than two partitions (e.g., TT, QT). Using TM costs to reorder candidate coding modes that correspond to different partitioning modes is described by reference to FIGS. 2-6 above.

The encoder computes (at block 1140) a TM cost for each candidate coding mode based on matching the current template with the reference template of the candidate coding mode. For some embodiments in which the candidate coding modes correspond to different partitioning modes, the TM cost of a candidate coding mode is computed based on the current templates and the reference templates of the multiple partitions that are created from the current block by the candidate coding mode. In some embodiments, the TM costs of the different partitioning modes are computed based on a same set of MVDs (that are signaled in the bitstream or derived from syntax elements in the bitstream).

The encoder selects (at block 1150) a candidate coding mode from the multiple candidate coding modes based on the computed TM costs. The encoder encodes (at block 1160) the current block into a bitstream by using selected candidate coding mode. In some embodiments, the direction of the partitioning is not signaled in the bitstream so that the decoder performs TM to determine the direction of the partitioning based on which direction has the lower TM cost.

In some embodiments, the multiple candidate coding modes correspond to multiple reference picture indices (refIdx) that identify reference pictures in a reference picture list for generating a prediction for encoding the current block. In some embodiments, the video encoder reorders the reference picture indices based on TM costs computed for the multiple candidate coding modes. The video encoder may signals a reordered reference picture index for identifying a reference picture. Using TM costs to reorder candidate coding modes that correspond to reference picture indices is described by reference to FIG. 7 above.

In some embodiments, the multiple candidate coding modes correspond to different bidirectional weighting indices (BCW indices) that identify different weighting options for two motion vectors in bidirectional prediction for the current block. The video encoder may reorder the bidirectional weighting indices based on TM costs computed for the multiple candidate coding modes. The video encoder may signal a reordered bidirectional weighting index for identifying a weighting option for the two motion vectors. Using TM costs to reorder candidate coding modes that correspond to BCW indices is described by reference to FIG. 8 above.

VI. Example Video Decoder

In some embodiments, an encoder may signal (or generate) one or more syntax element in a bitstream, such that a decoder may parse said one or more syntax element from the bitstream.

Figure 12:
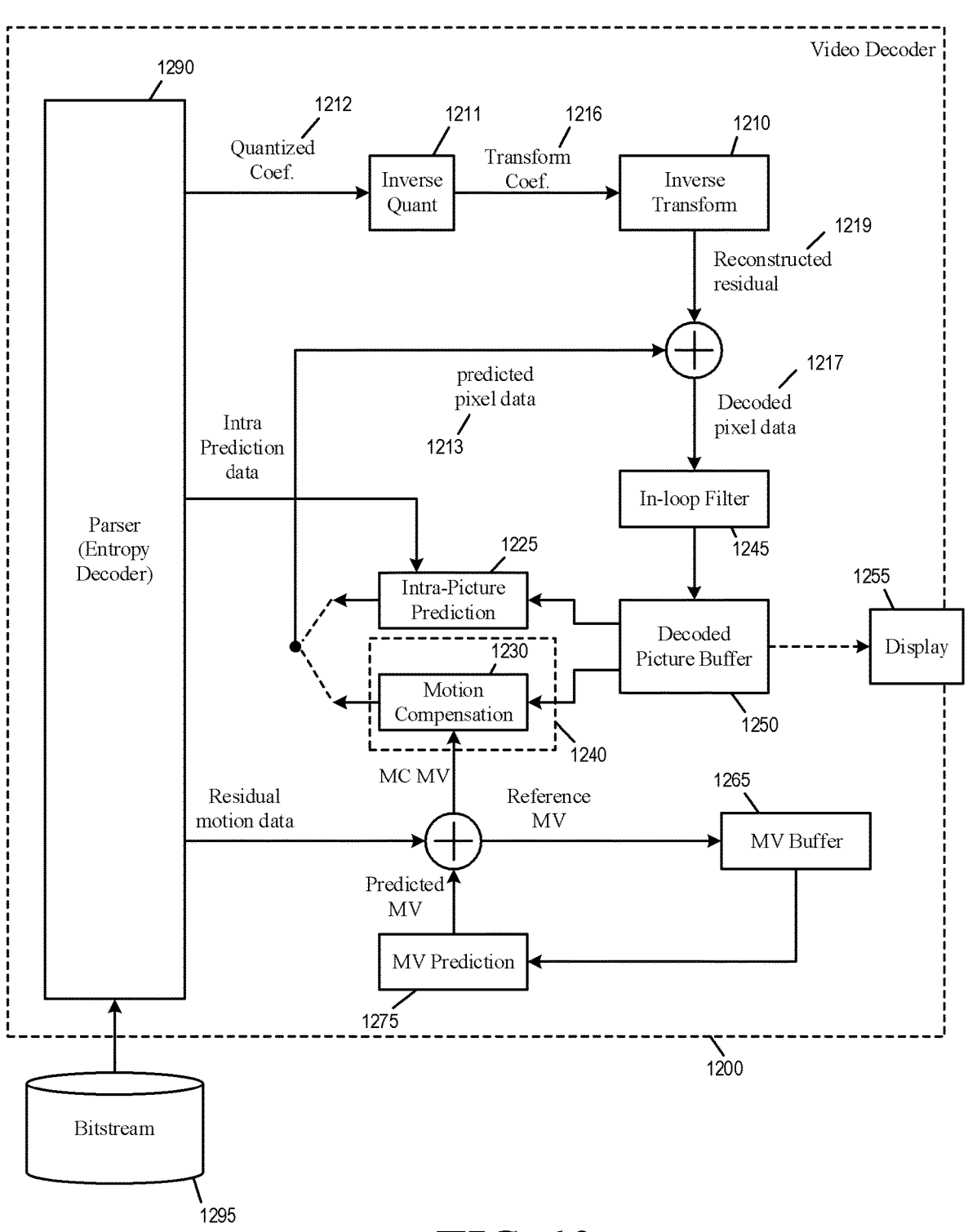
FIG. 12 illustrates an example video decoder that may use TM costs to refine selection of candidate coding modes.

FIG. 12 illustrates an example video decoder 1200 that may use TM costs to refine selection of candidate coding modes. As illustrated, the video decoder 1200 is an image-decoding or video-decoding circuit that receives a bitstream 1295 and decodes the content of the bitstream into pixel data of video frames for display. The video decoder 1200 has several components or modules for decoding the bitstream 1295, including some components selected from an inverse quantization module 1211, an inverse transform module 1210, an intra-prediction module 1225, a motion compensation module 1230, an in-loop filter 1245, a decoded picture buffer 1250, a MV buffer 1265, a MV prediction module 1275, and a parser 1290. The motion compensation module 1230 is part of an inter-prediction module 1240.

In some embodiments, the modules 1210-1290 are modules of software instructions being executed by one or more processing units (e.g., a processor) of a computing device. In some embodiments, the modules 1210-1290 are modules of hardware circuits implemented by one or more ICs of an electronic apparatus. Though the modules 1210-1290 are illustrated as being separate modules, some of the modules can be combined into a single module.

The parser 1290 (or entropy decoder) receives the bitstream 1295 and performs initial parsing according to the syntax defined by a video-coding or image-coding standard. The parsed syntax element includes various header elements, flags, as well as quantized data (or quantized coefficients) 1212. The parser 1290 parses out the various syntax elements by using entropy-coding techniques such as context-adaptive binary arithmetic coding (CABAC) or Huffman coding.

The inverse quantization module 1211 de-quantizes the quantized data (or quantized coefficients) 1212 to obtain transform coefficients, and the inverse transform module 1210 performs inverse transform on the transform coefficients 1216 to produce reconstructed residual signal 1219. The reconstructed residual signal 1219 is added with predicted pixel data 1213 from the intra-prediction module 1225 or the motion compensation module 1230 to produce decoded pixel data 1217. The decoded pixels data are filtered by the in-loop filter 1245 and stored in the decoded picture buffer 1250. In some embodiments, the decoded picture buffer 1250 is a storage external to the video decoder 20) 1200. In some embodiments, the decoded picture buffer 1250 is a storage internal to the video decoder 1200.

The intra-prediction module 1225 receives intra-prediction data from bitstream 1295 and according to which, produces the predicted pixel data 1213 from the decoded pixel data 1217 stored in the decoded picture buffer 1250. In some embodiments, the decoded pixel data 1217 is also stored in a line buffer (not illustrated) for intra-picture prediction and spatial MV prediction.

In some embodiments, the content of the decoded picture buffer 1250 is used for display. A display device 1255 either retrieves the content of the decoded picture buffer 1250 for display directly, or retrieves the content of the decoded picture buffer to a display buffer. In some embodiments, the display device receives pixel values from the decoded picture buffer 1250 through a pixel transport.

The motion compensation module 1230 produces predicted pixel data 1213 from the decoded pixel data 1217 stored in the decoded picture buffer 1250 according to motion compensation MVs (MC MVs). These motion compensation MVs are decoded by adding the residual motion data received from the bitstream 1295 with predicted MVs received from the MV prediction module 1275.

The MV prediction module 1275 generates the predicted MVs based on reference MVs that were generated for decoding previous video frames, e.g., the motion compensation MVs that were used to perform motion compensation. The MV prediction module 1275 retrieves the reference MVs of previous video frames from the MV buffer 1265. The video decoder 1200 stores the motion compensation MVs generated for decoding the current video frame in the MV buffer 1265 as reference MVs for producing predicted MVs.

The in-loop filter 1245 performs filtering or smoothing operations on the decoded pixel data 1217 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 13:
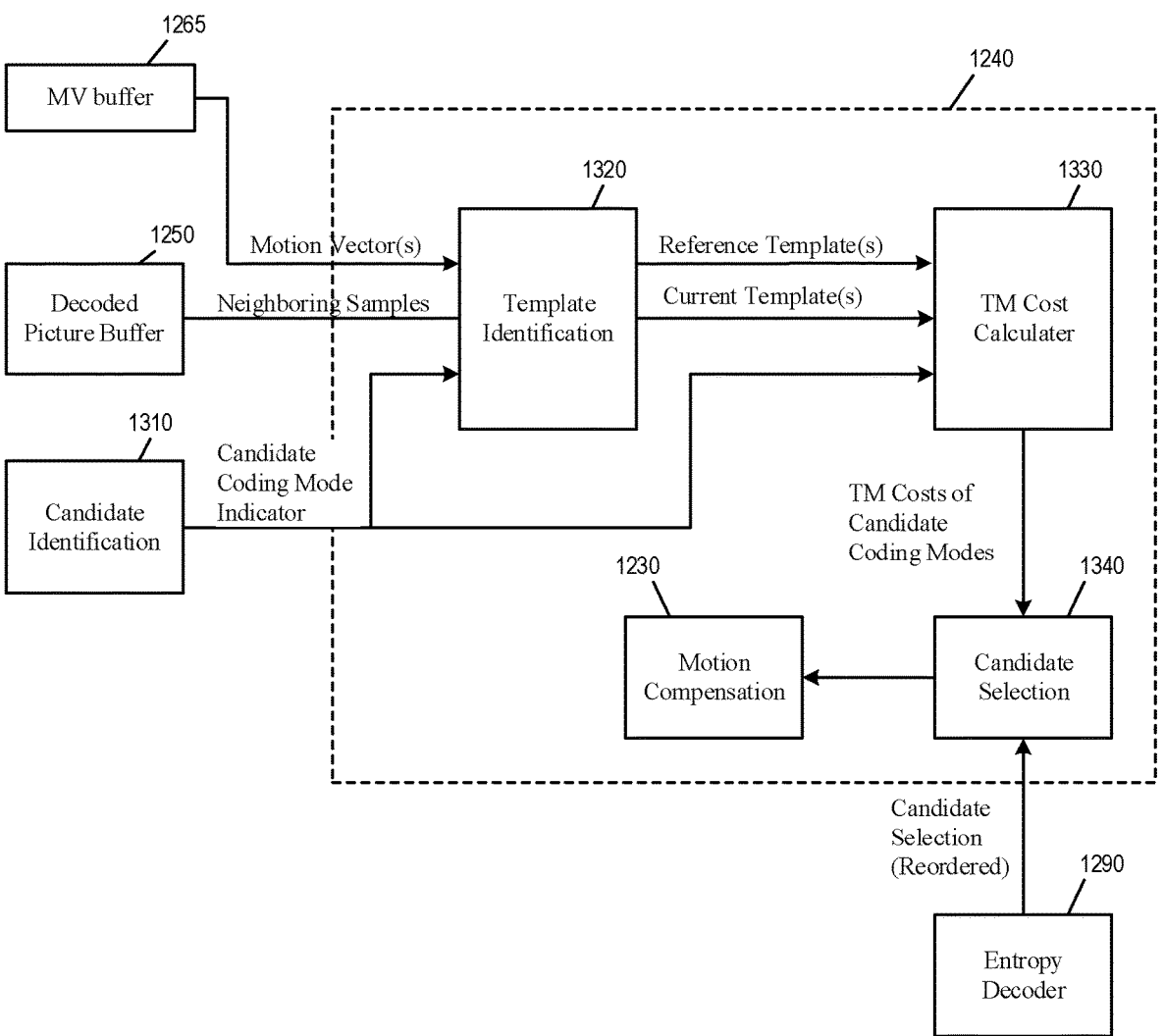
FIG. 13 illustrates portions of the video decoder that implement candidate coding mode selection based on TM costs.

FIG. 13 illustrates portions of the video decoder 1200 that implement candidate coding mode selection based on TM costs. Specifically, the figure illustrates the components of the inter-prediction module 1240 of the video decoder 1200. As illustrated, a candidate identification module 1310 provides candidate coding modes indicators to the inter-prediction module 1240. These possible candidate coding modes may correspond to various partitioning modes (BT, TT, UBT, UQT, BCW, etc.), different bidirectional weighting options (BCW indices), or different reference picture indices (refIdx).

Based on the candidate coding mode indicators, a template identification module 1320 selects motion vectors from the MV buffer 1265 and retrieves neighboring samples from the decoded picture buffer 1250 as L-shaped templates. For example, for a candidate coding mode that is a BT partitioning mode, the template identification module 1320 may retrieve neighboring pixels of the current block as two current templates of the two partitions of the current block and use two motion vectors to retrieve two L-shaped pixel sets as two reference templates. In another example, for a candidate coding mode that is a BCW weight option, the template identification module 1320 may retrieve two reference templates based on a L0 MV and a L1 MV.

The template identification module 1320 provides the reference template(s) and the current template(s) of the currently indicated coding mode to a TM cost calculator 1330, which performs matching to produce a TM cost for the indicated candidate coding mode. The TM cost calculator 1330 may weigh the reference templates differently based on the indicated candidate coding mode (e.g., for BCW).

The computed TM costs are provided to a candidate selection module 1340, which may assign reordered indices to the candidate coding modes based on the computed TM costs. The candidate selection module 1340 may receive signaling of the selected coding mode from the entropy decoder 1290, the signaling may uses the TM-cost-based reordered indices (so to reduce the number bits transmitted). The selected coding mode is indicated to the motion compensation module 1230 to complete the prediction for decoding the current block.

FIG. 14 conceptually illustrates a process 1400 that uses TM costs to refine selection of a candidate coding modes when decoding a block of pixels. In some embodiments, one or more processing units (e.g., a processor) of a computing device implements the decoder 1200 performs the process 1400 by executing instructions stored in a computer readable medium. In some embodiments, an electronic apparatus implementing the decoder 1200 performs the process 1400.

The decoder receives (at block 1410) data (e.g., from a bitstream) to be decoded as a current block of pixels in a current picture of a video. The decoder identifies (at block 1120) a set of pixels neighboring the current block as a current template.

The decoder identifies (at block 1430) a reference template of each candidate coding mode of multiple candidate coding modes. In some embodiments, the multiple candidate coding modes correspond to multiple different partitioning modes that each partitions the current block into two or more partitions. Each partition has a corresponding current template and a reference template that is identified by a motion vector associated with the partition. In some embodiments, the multiple different partitioning modes includes one or more partitioning modes that partitions the current block vertically (e.g., VBT, VTT, UBT-V, UQT-V) and one or more partitioning modes that partitions the current block horizontally (e.g., HBT, HTT, UBT-H, UQT-H). In some embodiments, the multiple different partitioning modes includes partitioning modes that partitions the current block symmetrically or into equal sized partitions (e.g., BT) and partitioning modes that partitions the current block asymmetrically or into different sized partitions (e.g., TT, UBT, UQT). In some embodiments, the multiple different partitioning modes includes partitioning modes that partitions the current block into two partitions (e.g., BT) and partitioning modes that partitions the current block into more than two partitions (e.g., TT, QT). Using TM costs to reorder candidate coding modes that correspond to different partitioning modes is described by reference to FIGS. 2-6 above.

The decoder computes (at block 1440) a TM cost for each candidate coding mode based on matching the current template with the reference template of the candidate coding mode. For some embodiments in which the different candidate coding modes correspond to different partitioning modes, the TM cost of a candidate coding mode is computed based on the current templates and the reference templates of the multiple partitions that are created from the current block by the candidate coding mode. In some embodiments, the TM costs of the different partitioning modes are computed based on a same set of MVDs (that are signaled in the bitstream or derived from syntax elements in the bitstream).

The decoder selects (at block 1450) a candidate coding mode from the multiple candidate coding modes based on the computed TM costs. The decoder reconstructs (at block 1460) the current block by using selected candidate coding mode. In some embodiments, the direction of the partitioning is not signaled in the bitstream so that the decoder performs TM to determine the direction of the partitioning based on which direction has the lower TM cost.

In some embodiments, the multiple candidate coding modes correspond to multiple reference picture indices (refIdx) that identify reference pictures in a reference picture list for generating a prediction for decoding the current block. In some embodiments, the video decoder reorders the reference picture indices based on TM costs computed for the multiple candidate coding modes. The video decoder may receive a reordered reference picture index for identifying a reference picture. Using TM costs to reorder candidate coding modes that correspond to reference picture indices is described by reference to FIG. 7 above.

In some embodiments, the multiple candidate coding modes correspond to different bidirectional weighting indices (BCW indices) that identify different weighting options for two motion vectors in bidirectional prediction for the current block. The video decoder may reorder the bidirectional weighting indices based on TM costs computed for the multiple candidate coding modes. The video decoder may receive a reordered bidirectional weighting index for identifying a weighting option for the two motion vectors. Using TM costs to reorder candidate coding modes that correspond to BCW indices is described by reference to FIG. 8 above.

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 15:
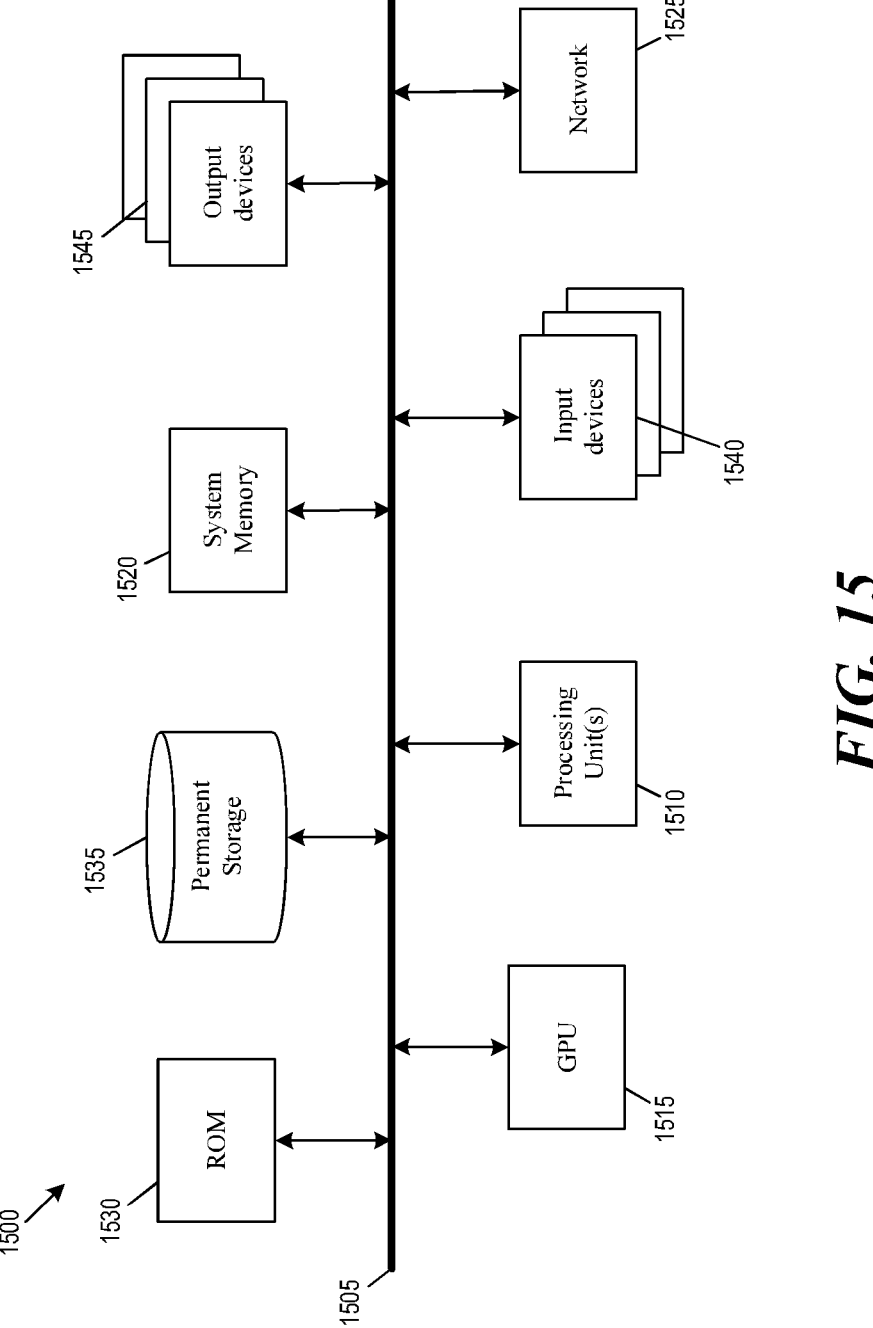
FIG. 15 conceptually illustrates an electronic system with which some embodiments of the present disclosure are implemented.

FIG. 15 conceptually illustrates an electronic system 1500 with which some embodiments of the present disclosure are implemented. The electronic system 1500 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1500 includes a bus 1505, processing unit(s) 1510, a graphics-processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the GPU 1515, the read-only memory 1530, the system memory 1520, and the permanent storage device 1535.

From these various memory units, the processing unit(s) 1510 retrieves instructions to execute and data to process in order to execute the processes of the present disclosure. The processing unit(s) may be a single processor or a multi-core processor in different embodiments. Some instructions are passed to and executed by the GPU 1515. The GPU 1515 can offload various computations or complement the image processing provided by the processing unit(s) 1510.

The read-only-memory (ROM) 1530 stores static data and instructions that are used by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the present disclosure use a mass-storage device (such as a magnetic or optical disk and its corresponding disk drive) as the permanent storage device 1535.

Other embodiments use a removable storage device (such as a floppy disk, flash memory device, etc., and its corresponding disk drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor uses at runtime. In some embodiments, processes in accordance with the present disclosure are stored in the system memory 1520, the permanent storage device 1535, and/or the read-only memory 1530. For example, the various memory units include instructions for processing multimedia clips in accordance with some embodiments. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alpha-numeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 11 and FIG. 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:
receiving data to be encoded or decoded as a current block of a current picture of a video;
identifying a set of pixels neighboring the current block as a current template;
identifying a reference template of each candidate coding mode in a plurality of candidate coding modes, wherein the plurality of candidate coding modes correspond to a plurality of reference picture indices that identify reference pictures in a reference picture list for generating a prediction for encoding or decoding the current block;
computing a template matching (TM) cost for each candidate coding mode based on matching the current template with the reference template of the candidate coding mode;
selecting a candidate coding mode from the plurality of candidate coding modes based on the computed TM costs; and
reconstructing the current block or encoding the current block into a bitstream by using selected candidate coding mode.

2. The video coding method of claim 1, wherein the plurality of candidate coding modes correspond to a plurality of different partitioning modes that each partitions the current block into a plurality of partitions, each partition having a corresponding current template and a reference template that is identified by a motion vector associated with the partition, wherein the TM cost of a candidate coding mode is computed based on the current templates and the reference templates of the plurality of partitions that are created from the current block by the candidate coding mode.

3. The video coding method of claim 2, wherein the TM costs of the different partitioning modes are computed based on a same set of motion vector differences (MVDs).

4. The video coding method of claim 2, wherein the plurality of different partitioning modes comprises partitioning modes that partitions the current block vertically and partitioning modes that partitions the current block horizontally.

5. The video coding method of claim 2, wherein the plurality of different partitioning modes comprises partitioning modes that partitions the current block symmetrically and partitioning modes that partitions the current block asymmetrically.

6. The video coding method of claim 2, wherein the plurality of different partitioning modes comprises partitioning modes that partitions the current block into two partitions and partitioning modes that partitions the current block into more than two partitions.

7. The video coding method of claim 2, wherein a direction of the partitioning is not signaled to a video decoder.

8. The video coding method of claim 1, further comprising reordering the plurality of reference picture indices based on TM costs computed for the plurality of candidate coding modes and signaling or receiving a reordered reference picture index for identifying a reference picture.

9. The video coding method of claim 1, wherein the plurality of candidate coding modes correspond to a plurality of bidirectional weighting indices that identify different weighting options for two motion vectors in bidirectional prediction for the current block.

10. The video coding method of claim 9, further comprising reordering the plurality of bidirectional weighting indices based on TM costs computed for the plurality of candidate coding modes and signaling or receiving a reordered bidirectional weighting index for identifying a weighting option for the two motion vectors.

11. An electronic apparatus comprising:
a video decoder or encoder circuit configured to perform operations comprising:
receiving data to be encoded or decoded as a current block of a current picture of a video;
identifying a set of pixels neighboring the current block as a current template;
identifying a reference template of each candidate coding mode in a plurality of candidate coding modes, wherein the plurality of candidate coding modes correspond to a plurality of reference picture indices that identify reference pictures in a reference picture list for generating a prediction for encoding or decoding the current block;
computing a template matching (TM) cost for each candidate coding mode based on matching the current template with the reference template of the candidate coding mode;
selecting a candidate coding mode from the plurality of candidate coding modes based on the computed TM costs; and
reconstructing the current block or encoding the current block into a bitstream by using selected candidate coding mode.

* * * * *